United States Patent [19]
Leistritz

[11] Patent Number: 5,899,063
[45] Date of Patent: May 4, 1999

[54] WATER-COOLED CATALYST SYSTEM

[75] Inventor: Klaus Leistritz, Zurzach, Switzerland

[73] Assignee: Tezet-Service AG, Bachenbulach, Switzerland

[21] Appl. No.: 08/836,840

[22] PCT Filed: Nov. 21, 1995

[86] PCT No.: PCT/CH95/00275

§ 371 Date: May 21, 1997

§ 102(e) Date: May 21, 1997

[87] PCT Pub. No.: WO96/16256

PCT Pub. Date: May 30, 1996

[30] Foreign Application Priority Data

Nov. 23, 1994 [CH] Switzerland .............................. 3529/94

[51] Int. Cl.$^6$ .................................................. F01N 3/00
[52] U.S. Cl. ............................................ 60/298; 422/173
[58] Field of Search ....................... 60/298, 274; 422/173

[56] References Cited

U.S. PATENT DOCUMENTS

| | | | |
|---|---|---|---|
| 3,041,149 | 6/1962 | Houdry | 422/173 |
| 3,091,920 | 6/1963 | Matvay | 60/298 |
| 4,359,863 | 11/1982 | Virk et al. | 422/173 |
| 5,033,264 | 7/1991 | Cabral | 60/274 |
| 5,212,949 | 5/1993 | Shiozawa . | |
| 5,239,825 | 8/1993 | Shibata . | |

FOREIGN PATENT DOCUMENTS

| | | | |
|---|---|---|---|
| 0314129 | 5/1989 | European Pat. Off. . | |
| 57-345 | 1/1982 | Japan | 60/298 |
| 57-32007 | 2/1982 | Japan | 60/298 |
| 58-5422 | 1/1983 | Japan | 60/298 |
| 59-34413 | 2/1984 | Japan . | |
| 59-120710 | 7/1984 | Japan . | |

*Primary Examiner*—Thomas E. Denion
*Attorney, Agent, or Firm*—Bachman & LaPointe, P.C.

[57] ABSTRACT

The invention concerns a system (20) used to reduce pollutant emissions in the form of hydrocarbons, carbon monoxides and nitric oxides from internal combustion engines, in particular from ships' engines or stationary engines. The catalyst housing (40) is covered by a gas-insulation hood (24) which is open upstream for the waste gas (18) to be decontaminated and is closed downstream. The gas-insulation hood (24) comprises a water cooler (28) which at least in some cases rests on the exterior thereof. The gas-insulation hood (24) preferably takes the form of a baffle silencer of known type of construction.

5 Claims, 4 Drawing Sheets

WATER-COOLED CATALYST SYSTEM

BACKGROUND OF THE INVENTION

The invention relates to a water-cooled catalyst system for reducing the emission of pollutants in the form of hydrocarbons, carbon monoxides and nitrous oxides from fuelled combustion engines, in particular ship engines or stationary engines An auto-ignition or a fuelled combustion engine with an external ignition system essentially generates carbon dioxide but also carbon monoxide, nitrous oxides and hydrocarbons which are emitted in the exhaust gases. Whereas the carbon and nitrous oxides are chemically defined compounds, the hydrocarbons comprise a large number of compounds.

Today, increasingly strict exhaust gas standards are being passed which now allow only very small residual quantities of the said toxic gases. This applies not only to car engines but increasingly also to ship engines and stationary engines. In particular, the increasing numbers of motor boats travelling on lakes and rivers will in the near future be subject to stricter regulations which allow scarcely any exhaust emissions from engines presently in use.

Exhaust cleaning technologies of petrol driven engines focus on catalysts controlled by a lambda probe, in particular three-way catalysts, but depending on the country also oxidation and/or double bed catalysts. These catalysts reach a high temperature in the range from 900° to 1000° C. after a short time, i.e. they develop a great heat radiation and must lie out of human reach. In cars this is not a problem, the catalysts are safely arranged below the vehicle floor at a relatively large distance from the engine, and exposed to cooling air flows. A boat engine however only allows catalytic exhaust gas detoxification if the catalyst is fitted in the immediate vicinity of the engine, where there is largely no cooling wind. In view of the heat developed by the catalyst and the associated risk of fire, despite the wide range on the market almost no boat engines can be found with catalytically cleaned exhaust gases. This is all the more disadvantageous as it is naturally more difficult for a boat to escape quickly and completely from its own exhaust gas cloud. In unfavourable wind conditions, such an exhaust gas cloud can accompany the boat for relatively long periods.

EP, B1 0314129 describes a catalyst system for petrol engines, using which exhaust gases from boat engines can be treated even when the injection mixture is rich, i.e. with high CO and HC emissions. This is aimed in particular at boat engines which are operated with very high lambda values of between 0.75 and 0.90. To solve the problem, a catalyst system is used with a reductive part lying upstream in the exhaust gas flow and an oxidative catalyst part lying downstream, with a purely axial guidance of the exhaust gas through the catalyst parts. The catalyst is surrounded by a water-cooled housing, so it cannot develop a great heat radiation. According to a feature essential to the invention, between the catalyst shell and the water-cooled housing is an air gap. Secondary air is drawn from the environment on the downstream end of the catalyst, guided through the said air gap into an intermediate chamber between the reductive and the oxidative catalyst parts and there expelled with the exhaust gases. The secondary air introduced via a special pump serves, in addition to secondary combustion of the rich injected fuel mixture, also to insulate the very hot catalyst from the cold water-cooled housing parts. The risk of fire on any leakage of exhaust gas into the boat in the event of a defect in the secondary air fan or secondary air line is eliminated by non-return valves.

The inventor has faced the task of creating a water-cooled catalyst system of the type described initially which can be used universally for all engine and catalyst types and which requires no additional pipelines with non-return valves.

SUMMARY OF THE INVENTION

The task is solved according to the invention in that the catalyst housing is surrounded by a gas insulation cover open upstream for the exhaust gas to be detoxified and closed downstream, which has on its outside a water cooler lying at least partially thereon. Special and further design forms of the invention are the subject of dependent claims.

The gas insulation cover ending blind in the flow direction of the exhaust gas is of essential significance to the invention. This surrounds the catalyst completely with the exception of the outlet opening for the detoxified exhaust gases. The inner wall of the gas insulation cover can be formed by the catalyst housing when sealed accordingly.

The gas insulation cover, referred to for the sake of simplicity as a gas shell, is designed such that the exhaust gases have sufficient clearance upstream to flow unhindered into the catalyst. The gas shell thus extends not only over the peripheral area but also over the area of the inlet openings for the catalyst. The gas insulation cover is essentially cup-shaped according to a preferred design variant.

If the gas insulation cover is designed as a double shell in the peripheral area, in the area of the base of the cup the inner wall is omitted or perforated such that the exhaust gas to be cleaned can emerge and flow unhindered into the catalyst.

The inlet and outlet openings of the catalyst may be opposite each other in the area of the longitudinal axis. If space is limited, for example in a boat engine, the exhaust gas to be cleaned can be guided into the peripheral shell of the gas insulation cover via an essentially tangential pipe inlet connector.

The gas insulation cover is suitably designed in the known manner as a reflection sound damper of the known type. The outer wall of the gas insulation cover corresponds to the outer shell pipe of a reflection sound damper, and the inner wall or catalyst housing corresponds to a gas guide pipe in an exhaust system. DE, C1 3810755 describes for example a reflection sound damper which in principle can also be used for a gas insulation cover according to the invention. The arrangement of the gas guide pipes and the intermediate bases is revised according to the case.

In contrast to EP, A1 0314129, no secondary air is ever passed to the gas insulation cover. The undetoxified exhaust gases which are guided into the gas insulation cover according to the invention are held there and serve as insulation without an inherent cooling effect. The accumulated exhaust gases separate the catalyst housing and the water cooler and the shock effect is damped. The expert has a wide range of variants available for the design of the gas insulation cover and water cooler which are defined as a function of the parameters.

The gas insulation cover and the water cooler are suitably made of a corrosion-resistant material easy to machine or mould which has a high heat conductivity at least for the water cooler. In the first place metals are suitable, in particular copper materials, which are available in many qualities.

To cool the gas insulation cover on all sides and thus, through the insulation layer, the catalyst, a water cooler suitably runs all round but in certain applications only a specific part need be cooled. For flat catalysts, for example, the outside in relation to the vehicle can be cooled whereas the part of the catalyst housing facing the engine has no cooling water.

In a first variant, the water cooler is designed as a water shell which lies on the gas insulation cover over its entire surface and is connected to this, e.g. directly welded, soldered, screwed, riveted, clamped or glued, where in the latter case the layer of adhesive can assume the function of the heat insulating layer.

In a second variant, the water cooler is designed in the form of water pipes which are connected in principle to the gas insulation cover like a water shell. The pipes can be designed in all conventional shapes of the quality concerned, for example round, elliptical, square or rectangular in cross section.

For better heat transmission from the coolant to the water cooler, this may have longitudinal fins which project into the flow channel but which offer the smallest possible resistance to the medium. The fins are suitably made of the same material as the wall of the water cooler and are welded or soldered to this or co-extruded with this.

The catalyst housing in the gas insulation cover and the external water cooler, which can preferably be drained by activation of a magnetic valve, can easily be mounted in the normal manner for the expert, for example by screwing, welding, riveting etc.

The catalyst system according to the invention can be operated particularly advantageously if a fuelled combustion engine which generates the gas to be cleaned is started with the water cooler drained, the exhaust gas temperature is measured continuously, and the cooling water is added when a first prespecifiable exhaust gas temperature is reached, a second prespecifiable exhaust gas temperature is maintained, and after stopping the engine the cooling water is drained from the catalyst system, where the exhaust gas temperatures are measured at the catalyst outlet.

The water-cooled catalyst system is controlled at least partly by a measuring sensor which projects into the exhaust gas flow on the catalyst outlet and is connected to a microprocessor. The microprocessor switches the metering of the coolant water flow fully automatically in the known manner via actuator elements such as magnetic valves.

The water cooler which is empty when the engine starts allows the catalyst to have reached an internal temperature of at least 280° C., corresponding approximately to the first exhaust gas temperature $T_1$, and thus be ready for operation after 30 to 60 seconds. The coolant water supply is turned on at the latest when 400° C. is achieved, preferably in the range from 300° to 350° C. If the exhaust gas temperature continues to rise, cooling water is added in a program-controlled manner such that the exhaust gas temperature $T_2$ fluctuates about a second prespecifiable value in the range from 450° to 750° C., preferably from 480° to 700° C.

The first specifiable exhaust gas temperature $T_1$ is primarily engine-dependent, the second specifiable exhaust gas temperature $T_2$ is engine- and performance-dependent.

It is determined that at full load on a two-stroke boat engine, for example, an optimum second exhaust gas temperature $T_2$ is approximately 720° C.; at normal load the temperature is from 490° to 520° C. The control processes are optimised and recorded to be type-specific.

Using this invention, environmentally harmful areas of application for catalysts which were previously scarcely accessible for economic use can be accessed in a technically improved way provided that sufficient quantities of the cooling medium water are available. This applies to new installations and to modifications.

Water-cooled catalysts can be used in connection with two or four-stroke petrol engines and diesel engines; in stationary and mobile variants for ships, agricultural and industrial purposes. In boat engines which are of particular interest, the catalyst no longer constitutes a source of danger as the surfaces have a temperature in the range from 30° to 50° C. This eliminates not only the risk of fire but also the risk of burns from accidental contact.

BRIEF DESCRIPTION OF THE DRAWINGS

The invention is now explained in more detail using the design examples shown in the drawing which are the subject of dependent claims. Here:

DETAILED DESCRIPTION

Figure 1:
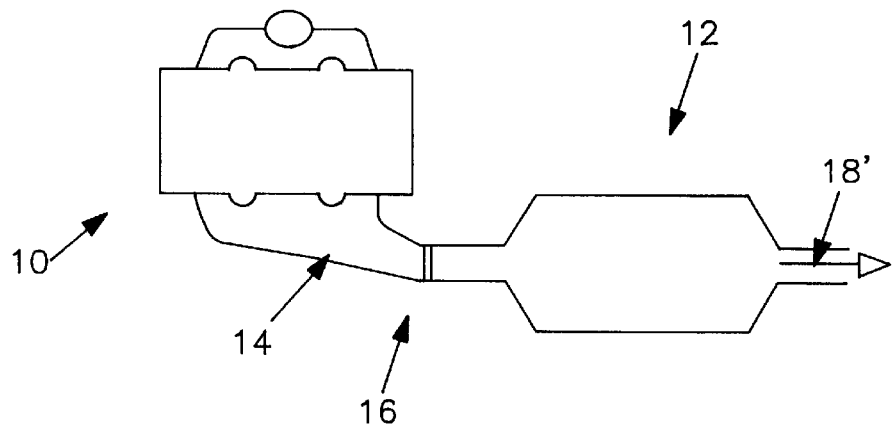
FIG. 1 shows a fuelled combustion engine with a catalyst system.
Figure 2:
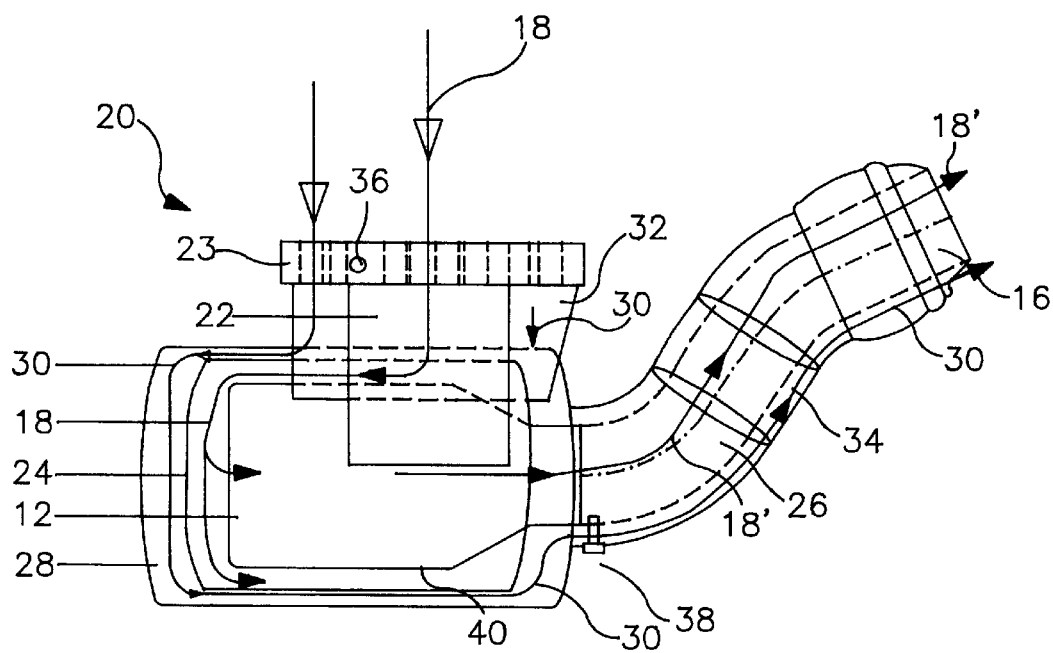
FIG. 2 shows an outline of a catalyst system.
Figure 3:
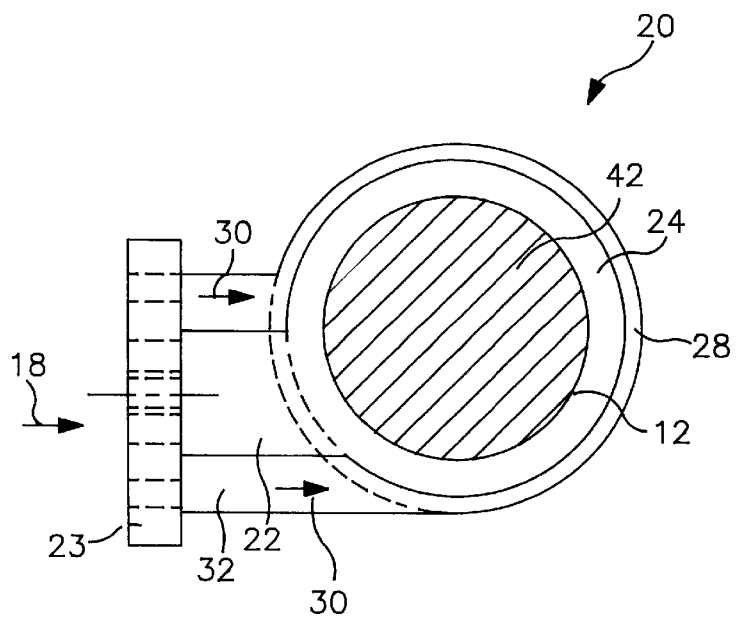
FIG. 3 shows a side view of a catalyst system according to FIG. 2.

In FIG. 1, 10 indicates a fuelled combustion engine fitted with a catalyst 12. The engine has in the conventional manner an exhaust pipe with an exhaust manifold 14 to which is flanged the catalyst 12 by means of a collar 16. The exhaust gas 18 indicated by an arrow leaves the catalyst 12 cleaned, with a low residual content of toxic gases. In a boat engine, for example, the engine 10 and catalyst 12 are however arranged immediately next to each other and not in succession longitudinally as shown in principle in FIG. 1. As a catalyst 12, any conventional catalyst with a steel shell or a catalyst specially adapted to implement the present invention can be used, the targeted water-cooled catalyst system being achieved in any case together with the gas insulation cover and water cooler according to the invention FIGS. 2 and 3 show a catalyst system 20 of a fuelled combustion engine 10 (FIG. 1). The uncleaned exhaust gas 18 is passed to the catalyst 12 via a pipe inlet connector 22 with a flange 23. The undetoxified exhaust gas 18 is first passed in approximately tangential direction into the shell chamber of an essentially cup-shaped gas insulation cover form in gap 24 between catalyst housing 40 and the water cooler housing (not numbered). This gas insulation cover and gap 24 is designed blind in the direction of the exhaust gas pipe 26 for the cleaned exhaust gas 18'. The uncleaned exhaust gas 18 is passed through the catalyst 12 into the exhaust gas pipe 26. The undetoxified exhaust gas 18 is held in the gas insulation cover 24 or its shell, and forms, for the surrounding water cooler 28, an insulation layer communicating with the undetoxified exhaust gas 18 passed to the catalyst 12.

The cooling water 30 is passed over the cooling shell 32 into the water cooler 28 of the catalyst 12 and from there expelled via the cooling shell 34 of the exhaust gas pipe. The cooling water 30 can also be guided in the reverse direction against the flow.

For exhaust gas extraction before the catalyst, a sealing tap 36 is arranged in flange 23. For exhaust gas extraction after the catalyst, a further sealing tap 38 is provided in the exhaust gas pipe 26.

Figure 4:
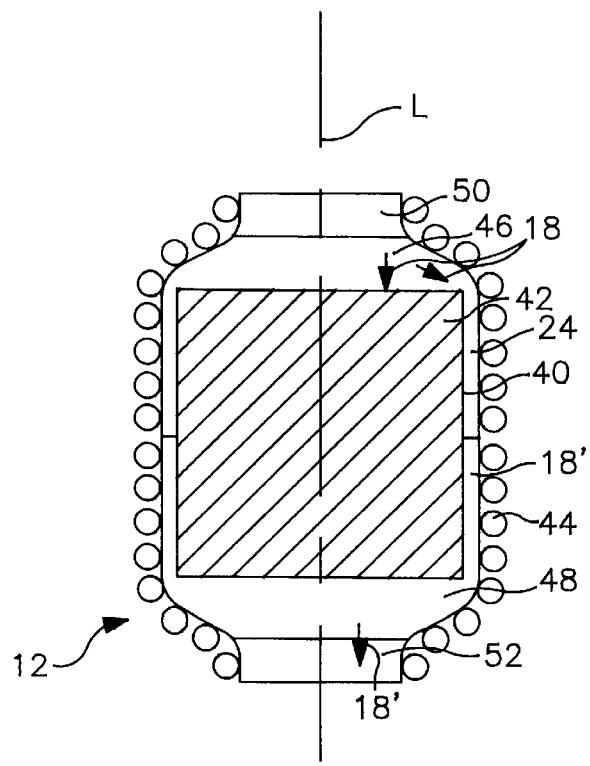
FIG. 4 shows a catalyst with a gas insulation cover and a water cooler.

FIG. 4 shows a catalyst 12 with a catalyst housing 40 of steel and inset a monolith 42, the active part of the catalyst 12. This monolith 42, also referred to as the carrier body, usually consists of a honeycomb-like basic body of ceramic or metal of different cross sectional forms. The ceramic material is resistant to high temperature and in the present case comprises 90% cordierite. This cell carrier represents an optimum compromise with regard to:

thermal shock resistance heat expansion mechanical strength large clear cross sectional area and large geometric surface.

In the catalyst housing 40, consisting of two half shells, transverse ribs are formed normally running perpendicular to the longitudinal axis L of the catalyst 12, which ribs are not shown in the present and following figures.

The catalyst housing 40 is surrounded by a gas insulation cover 24 formed as a double shell which lies directly on the catalyst housing 40. The cooling water 30 flows under programmed control through a cooling pipe 44 which surrounds the gas insulation cover 24 as a helix. The general flow direction of the coolant water is here opposite that of the exhaust gas 18.

An inlet connector 50 connected to the inlet hopper 46 of the catalyst 12 can, like the outlet connector 52 connected to the outlet hopper 48, be designed in a curved shape which allows for the cramped conditions for example of a boat engine.

The inlet connector 50 and the outlet connector 52 are usually connected detachably or non-detachably to the corresponding parts of the exhaust system.

Figure 5:
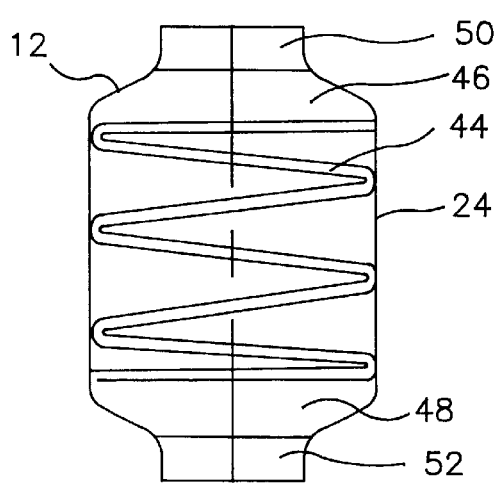
FIG. 5 shows a catalyst with a serpentine cooling pipe.
Figure 6:
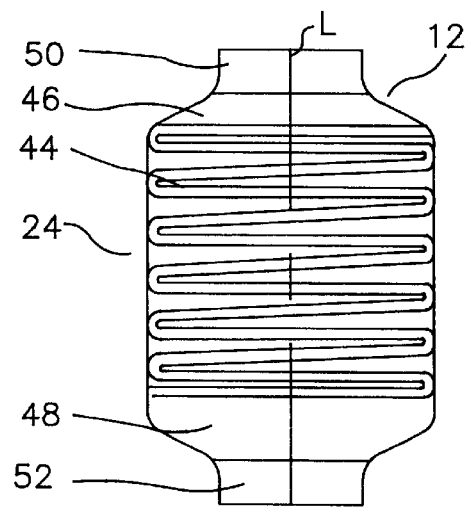
FIG. 6 shows a variant similar to FIG. 5.

FIGS. 5 and 6 each show a flat bed, bottle-like catalyst 12. On the front of both catalysts is a water-filled cooling pipe 44 arranged as a serpentine on the gas insulation cover 24. On the similarly flat back, a cooling pipe 44 can also be arranged as a serpentine. In FIG. 6, the straight pipe sections lie closer together than in FIG. 5 so the cooling effect is greater while the other parameters remain the same.

Figure 7:
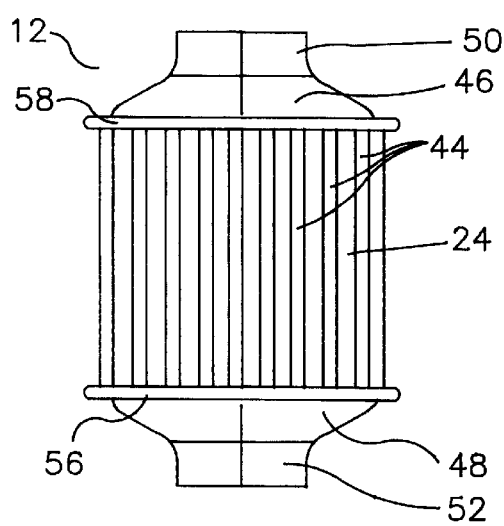
FIG. 7 shows a catalyst with longitudinal cooling pipes.

In the design form in FIG. 7, the catalyst 12 is cooled by cooling pipes 44 lying directly on the gas insulation cover 24 of the catalyst housing 40 and running in the axial direction L. These are fed from a lower or upper ring channel 56, 58 where the other ring channel serves as an outlet.

Figure 8:
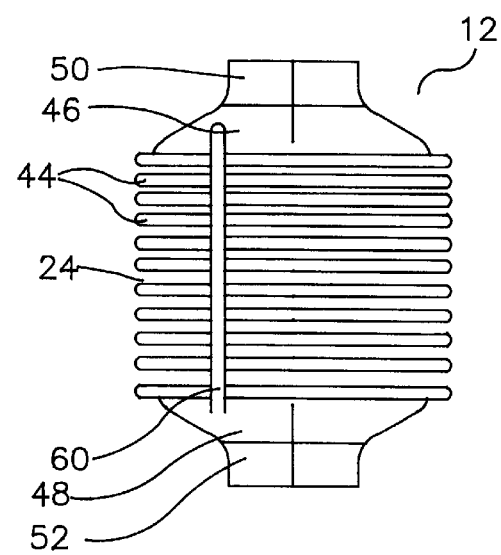
FIG. 8 shows a catalyst with annular cooling pipes.

The catalyst 12, or more precisely its gas insulation cover 24, is cooled according to FIG. 8 by the annular cooling pipes 44 which are supplied with cooling water through two diagonally opposed vertical connecting channels 60, where one connecting channel 60 serves as a supply and the other as an outlet.

Figure 9:
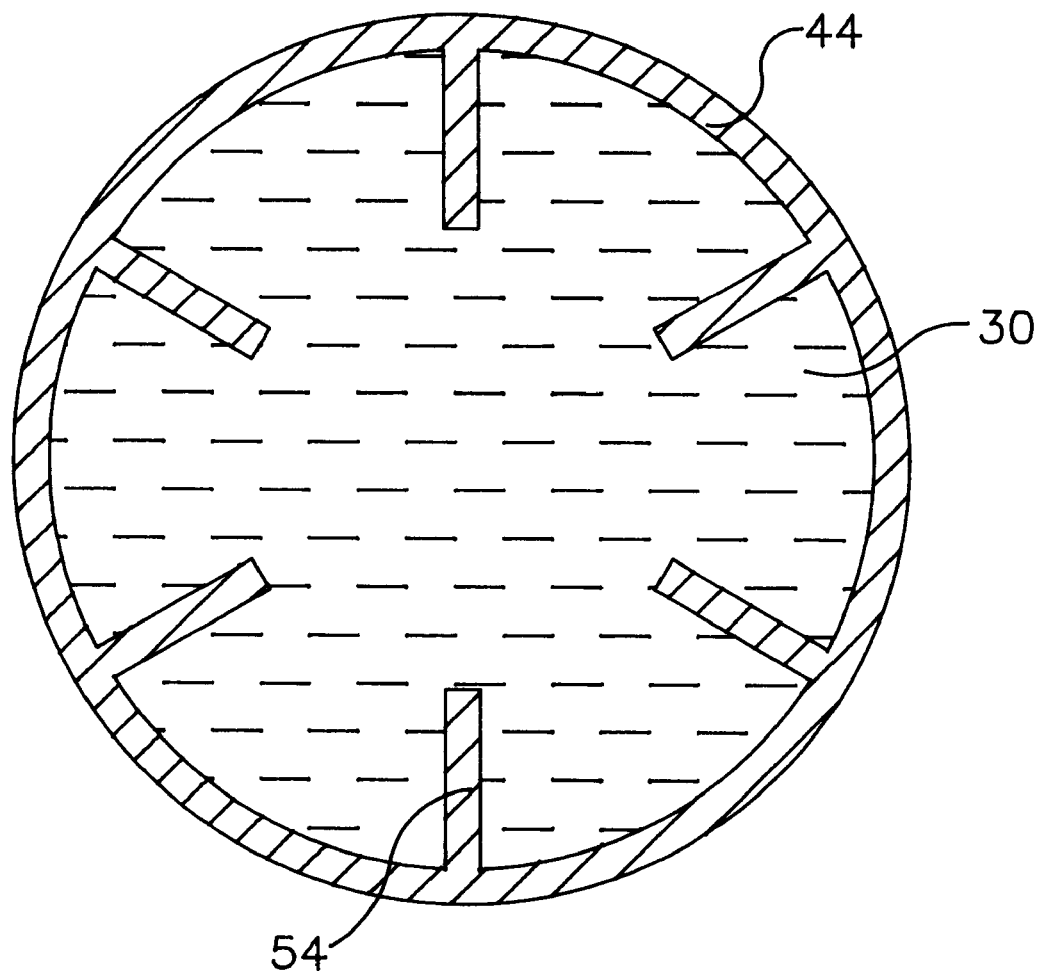
FIG. 9 shows a cross section through a cooling pipe with fins.

FIG. 9 shows in cross section a water-filled cooling pipe 44 which has six fins 54 projecting radially inwards and running axially longitudinally. These fins 54, like the cooling pipe 44, are made of copper and are co-extruded or welded on. Evidently the fins 54 can also have a more complicated geometric shape.

I claim:

1. A water-cooled catalyst system for reducing emission of pollutants from exhaust gases from a fueled combustion engine comprising:

a water cooler having a housing defining an internal space and having a tangential longitudinal inlet opening for feeding exhaust gases to said internal space and an outlet opening for removing said exhaust gases from said internal space;

a catalyst housing containing a catalyst, said catalyst having an inlet upstream of said catalyst for receiving said exhaust gases and an outlet downstream of said catalyst for passing said exhaust gases to said outlet opening of said water cooler housing, said catalyst housing being located in said internal space so as to define with said water cooler housing a cup-shaped gap therebetween for receiving said exhaust gases so as to surround said catalyst housing in an exhaust gas insulation cover prior to passing said exhaust gases through said catalyst.

2. A catalyst system according to claim 1 wherein said water cooler housing is flanged to said combustion engine.

3. A catalyst system according to claim 1 wherein said water cooler housing defines an internal cooling shell for receiving a cooling medium for cooling said exhaust gas insulation cover.

4. A catalyst system according to claim 3 wherein an exhaust gas pipe communicates which said outlet opening and includes an internal cooling passage for receiving said cooling medium from said internal cooling shell.

5. A catalyst system according to claim 1 wherein said gas insulation cover acts as a reflection sound damper.

* * * * *

UNITED STATES PATENT AND TRADEMARK OFFICE
CERTIFICATE OF CORRECTION

PATENT NO.   : 5,899,063
DATED        : May 4, 1999
INVENTOR(S)  : KLAUS LEISTRITZ

It is certified that error appears in the above-identified patent and that said Letters Patent is hereby corrected as shown below:

In Column 6, claim 1, line 20, after "tangential" delete "longitudinal".

Signed and Sealed this

Twenty-third Day of November, 1999

*Attest:*

Q. TODD DICKINSON

*Attesting Officer*         *Acting Commissioner of Patents and Trademarks*